(12) United States Patent
Zhao

(10) Patent No.: US 11,223,711 B2
(45) Date of Patent: Jan. 11, 2022

(54) TERMINAL DEVICE AND DISPLAY METHOD FOR FULL-SCREEN DISPLAY

(71) Applicant: BEIJING XIAOMI MOBILE SOFTWARE CO., LTD., Beijing (CN)

(72) Inventor: Ming Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/685,350

(22) Filed: Nov. 15, 2019

(65) Prior Publication Data
US 2021/0006647 A1   Jan. 7, 2021

(30) Foreign Application Priority Data

Jul. 1, 2019  (CN) .......................... 201910586889.9

(51) Int. Cl.
| | | |
|---|---|---|
| *H04M 1/02* | (2006.01) | |
| *G06T 1/00* | (2006.01) | |
| *H05K 5/02* | (2006.01) | |
| *H05K 5/00* | (2006.01) | |
| *E05B 47/00* | (2006.01) | |

(52) U.S. Cl.
CPC ......... *H04M 1/0266* (2013.01); *G06T 1/0007* (2013.01); *H05K 5/0017* (2013.01); *H05K 5/0217* (2013.01); *E05B 47/0038* (2013.01)

(58) Field of Classification Search
CPC . H05K 5/0217; H05K 5/0017; H04M 1/0266; E05B 47/0038
See application file for complete search history.

(56) References Cited

U.S. PATENT DOCUMENTS

| | | | | |
|---|---|---|---|---|
| 10,871,701 | B2* | 12/2020 | Park | ........................ G02B 7/02 |
| 10,887,436 | B2* | 1/2021 | Zeng | ................... H04M 1/0235 |
| 2005/0014527 | A1* | 1/2005 | Chambers | ............ H04N 5/2354 |
| | | | | 455/556.1 |
| 2010/0259515 | A1* | 10/2010 | Kohara | ................. G06F 1/1624 |
| | | | | 345/204 |

(Continued)

FOREIGN PATENT DOCUMENTS

| | | | |
|---|---|---|---|
| CN | 108376019 A | * | 8/2018 |
| CN | 108376019 A | | 8/2018 |
| EP | 3373562 A1 | | 9/2018 |

OTHER PUBLICATIONS

Supplementary European Search Report in the European application No. 19211805.7, dated May 13, 2020.

*Primary Examiner* — Rockshana D Chowdhury
*Assistant Examiner* — Douglas R Burtner
(74) *Attorney, Agent, or Firm* — Syncoda LLC; Feng Ma

(57) ABSTRACT

A terminal device includes: a first screen component having a first opening; an image acquisition component having a light-sensitive surface and configured to sense ambient light based on the light-sensitive surface to generate an image when the first opening is opened; and a second screen component. When the second screen component is at a first position, the first opening is opened; and when the second screen component is at a second position, the second screen component closes the first opening to cover the light-sensitive surface and performs joint display with the first screen component. Therefore, a position of a second screen can be adjusted to achieve a full-screen display effect.

8 Claims, 14 Drawing Sheets

(56) References Cited

U.S. PATENT DOCUMENTS

| | | | |
|---|---|---|---|
| 2013/0344921 A1* | 12/2013 | Kamii | H04M 1/0266 |
| | | | 455/566 |
| 2014/0074696 A1* | 3/2014 | Glaser | G06Q 20/341 |
| | | | 705/39 |
| 2018/0011578 A1* | 1/2018 | Choi | G02B 27/0172 |
| 2018/0070482 A1* | 3/2018 | Choi | H05K 5/0017 |
| 2018/0262663 A1* | 9/2018 | Zhang | H04M 1/0264 |
| 2018/0348024 A1* | 12/2018 | Kim | G01D 3/024 |
| 2019/0052738 A1* | 2/2019 | Zeng | H04M 1/18 |
| 2019/0253537 A1* | 8/2019 | Fan | G06F 1/1686 |
| 2019/0253541 A1* | 8/2019 | Fan | H04N 1/00307 |
| 2019/0306394 A1 | 10/2019 | Zhang | |
| 2020/0120193 A1* | 4/2020 | Ha | H04M 1/0266 |
| 2020/0213691 A1* | 7/2020 | Zeng | H04R 1/025 |
| 2020/0266845 A1* | 8/2020 | Kumar | G06F 1/1656 |
| 2020/0288003 A1* | 9/2020 | Zeng | H04N 5/2257 |

* cited by examiner

TERMINAL DEVICE AND DISPLAY METHOD FOR FULL-SCREEN DISPLAY

CROSS-REFERENCE TO RELATED APPLICATION

This application claims priority to Chinese patent application No. 201910586889.9 filed on Jul. 1, 2019, the disclosure of which is hereby incorporated by reference in its entirety.

BACKGROUND

Along with the development of mobile phone technologies and popularization of intelligent terminal devices, there is a growing pursuit for full screens with high screen-to-body ratios of these terminals. However, a front camera of an existing terminal device occupies a certain space of a screen, resulting in reduction of a screen-to-body ratio of the terminal device. As a result, displaying of the terminal device is limited, and a user experience is affected.

SUMMARY

The present disclosure relates to the technical field of electronic devices, and more particularly, to a terminal device and a display method.

According to a first aspect of embodiments of the present disclosure, a terminal device is provided, which can at least include: a first screen component, having a first opening; an image acquisition component, having a light-sensitive surface and configured to sense ambient light based on the light-sensitive surface to generate an image when the first opening is opened; and a second screen component. When the second screen component is at a first position, the first opening can be opened; and when the second screen component is at a second position, the second screen component can close the first opening to cover the light-sensitive surface and perform joint display with the first screen component.

According to a second aspect of the embodiments of the present disclosure, a display method is provided, which can include that the following operations. A second screen component is driven to move between a first position and a second position. When the second screen component is at the first position, a first opening of a first screen component is opened, ambient light is sensed through the opened first opening based on a light-sensitive surface of an image acquisition component, and an image is generated. When the second screen component is at the second position, the second screen component closes the first opening to cover the light-sensitive surface of the image acquisition component and performs joint display with the first screen component.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the present disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
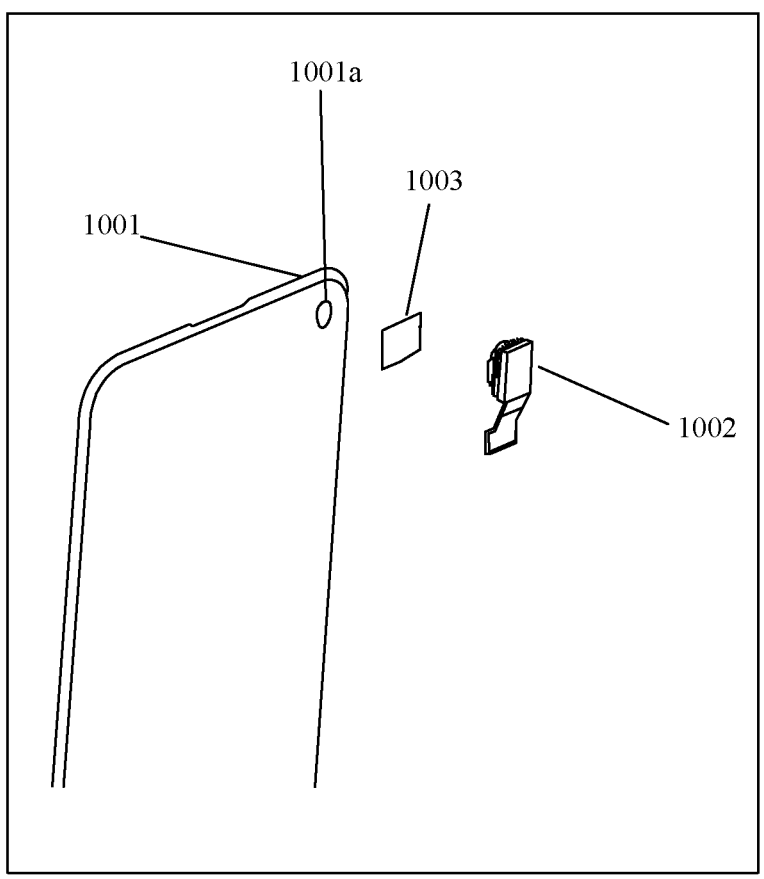
FIG. 1 is a first structure diagram of a terminal device according to some embodiments of the present disclosure.

FIG. 1 is a first structure diagram of a terminal device according to some embodiments of the present disclosure. As shown in FIG. 1, the terminal device 1000 at least includes a first screen component 1001, an image acquisition component 1002 and a second screen component 1003.

The first screen component 1001 has a first opening 1001a.

The image acquisition component 1002 has a light-sensitive surface and is configured to sense ambient light based on the light-sensitive surface to generate an image when the first opening is opened.

When the second screen component 1003 is at a first position, the first opening is opened; and when the second screen component 1003 is at a second position, the second screen component 1003 closes the first opening to cover the light-sensitive surface and jointly displaying with the first screen component 1001.

In the embodiment of the present disclosure, the terminal device 1000 at least includes the first screen component 1001, the image acquisition component 1002 and the second screen component 1003.

In some embodiments, the terminal device 1000 can be a wearable electronic device and a mobile terminal, and the mobile terminal includes a mobile phone, a notebook computer and a tablet computer. There are no limits made in the embodiment of the present disclosure.

In the embodiment of the present disclosure, the first screen component 1001 is configured to display information.

In some embodiments, the first screen component includes a liquid crystal display (LCD) screen, an Organic Light-Emitting Diode (OLED) display screen, or other types of display screens. There are no limits made in the embodiments of the present disclosure.

In the embodiments of the present disclosure, a shape and size of the first opening 1001a of the first screen component 1001 are adapted to a shape and size of the light-sensitive surface respectively.

It is to be noted that the shape of the first opening 1001a can also be set according to the shape of the light-sensitive surface of the image acquisition component. For example, when the shape of the light-sensitive surface is a circle, the first opening can also be arranged to be a circle; and when the shape of the light-sensitive surface is an ellipse, the first opening can also be arranged to be an ellipse.

Of course, the size of the first opening 1001a can also be set according to the size of the light-sensitive surface of the image acquisition component. For example, the size of the light-sensitive surface is provided to be equal to the size of the first opening, or, the size of the light-sensitive surface is provided to be less than the size of the first opening.

It is to be noted that the light-sensitive surface can be made of a semiconductor material.

In some embodiments, the semiconductor material includes, but not limited to, a Charge Coupled Device (CCD) and a Complementary Metal Oxide Semiconductor (CMOS).

Of course, the light-sensitive surface can also be provided with different colors to meet different user requirements. For example, the light-sensitive surface can be arranged to be black or blue.

In some embodiments, the image acquisition component 1002 includes a camera, and the camera is a camera disposed on a surface where a screen of the terminal screen is located.

In the embodiment of the present disclosure, when the second screen component is at the first position, the first opening is opened; and when the second screen component is at the second position, the second screen component closes the first opening to cover the light-sensitive surface and performing joint displaying with the first screen component.

In some embodiments, when the second screen component moves to the first position, the second screen component is positioned on the back side of a display surface of the first screen component, and the first opening is opened. When the second screen component moves to the second position, the second screen component is possible to be exposed through the first opening, and the exposed second screen component performs joint displaying with the first screen component.

Figure 2:
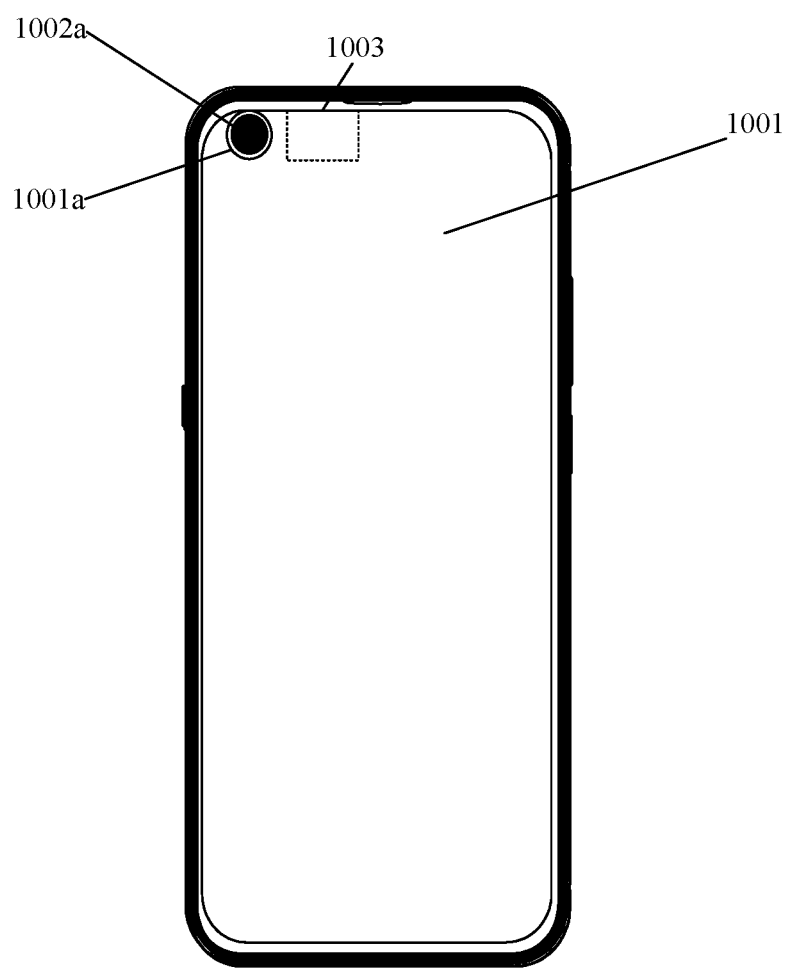
FIG. 2 is a second structure diagram of a terminal device according to some embodiments of the present disclosure.

In some embodiments, as shown in FIG. 2, when the second screen component 1003 is at the first position, the first opening 1001a is opened, and the light-sensitive surface 1002a is exposed through the first opening 1001a. In such case, an image can be generated through the exposed light-sensitive surface 1002a by a user, and exposure of the light-sensitive surface for image generation can be implemented when the user takes a selfie.

Figure 3:
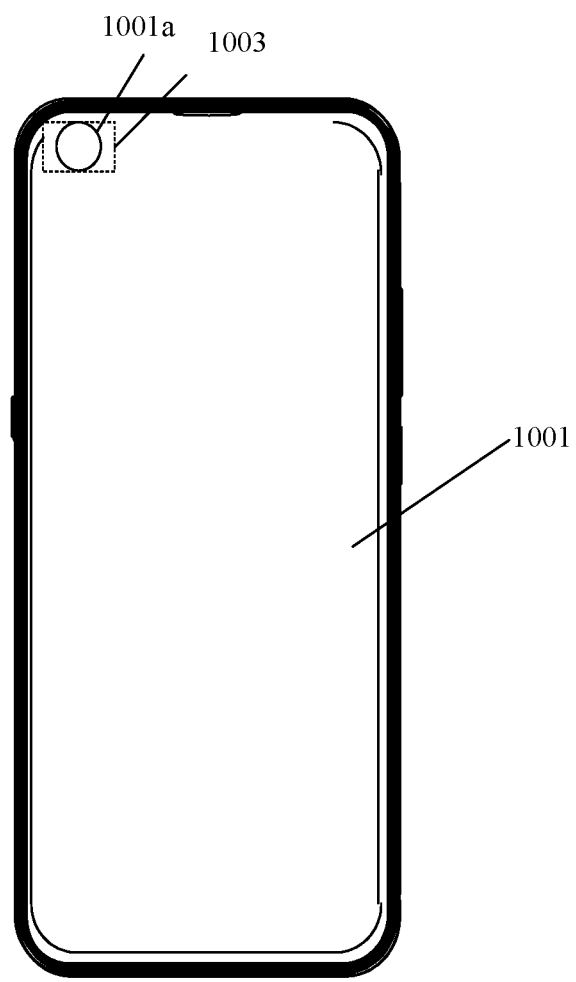
FIG. 3 is a third structure diagram of a terminal device according to some embodiments of the present disclosure.

As shown in FIG. 3, when the second screen component 1003 is at the second position, the second screen component closes the first opening 1001a, the second screen component is exposed through the first opening 1001a, and the exposed second screen component 1003 is in a display state and performs joint displaying with the first screen component 1001. Therefore, the second screen component can cover the first opening and implement joint displaying with the first screen component to achieve a visually full-screen displaying effect.

It is to be noted that a size of the second screen component 1003 is matched with a size of the first opening. For example, the size of the second screen component 1003 can be equal to or greater than the size of the first opening. Therefore, the first opening can be covered so that the second screen component performs joint display with the first screen component to achieve the visual full-screen effect.

In various embodiments of the present disclosure, the first screen component performing joint displaying with the second screen component can refer to that the first screen component and the second screen component display different display parts of the same display content.

In some embodiments, when a webpage is displayed, the first screen component displays a first part of content in a display content of the webpage, and the second screen component displays a second part of content in a display content of the webpage. The first part of content and the second part of content consist of a display content of the webpage.

Figure 4:
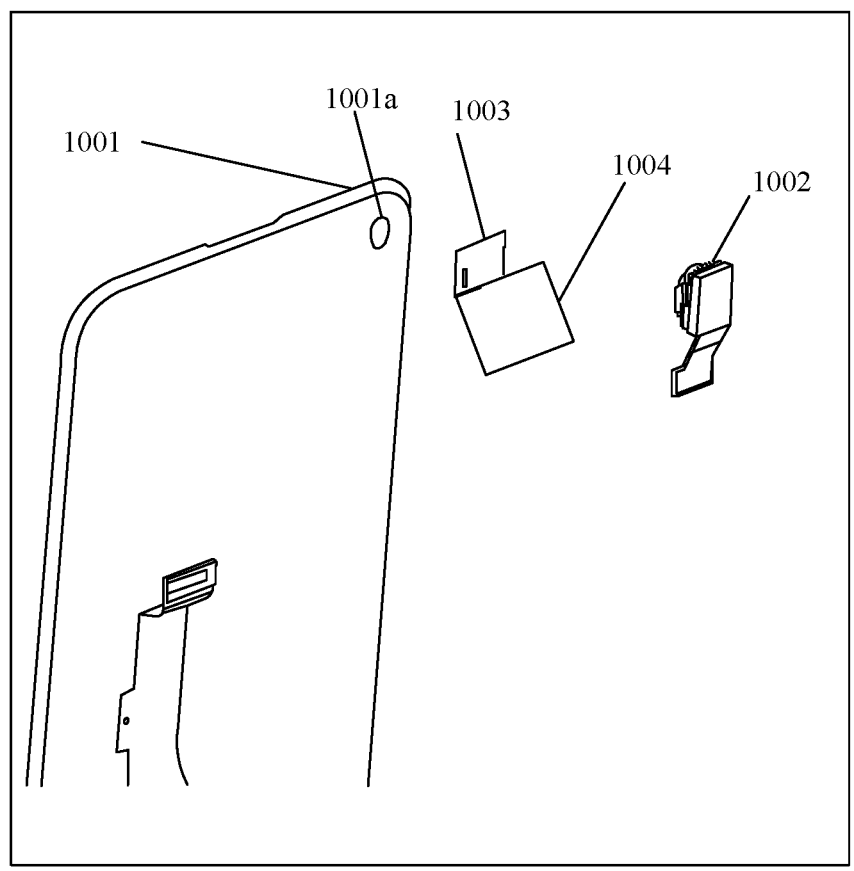
FIG. 4 is a fourth structure diagram of a terminal device according to some embodiments of the present disclosure.

In some embodiments, as shown in FIG. 4, the terminal device further includes: a driving component.

The driving component is connected with the second screen component and configured to drive the second screen component to move between the first position and the second position.

It is to be noted that the first position can be provided to be a starting position and the second position can be provided to be an ending position, or the first position can be provided to be the ending position and the second position can be provided to be the starting position. That is, the second screen component can gradually move from the starting position to the ending position, and can also gradually move from the ending position to the starting position.

In some embodiments, the driving component includes, but not limited to, a magnetic driving component and a motor driving component.

In some embodiments, the terminal device 1000 further includes a protection component 1005, and the protection component 1005 covers the first screen component and is configured to protect the first screen component.

Figure 5:
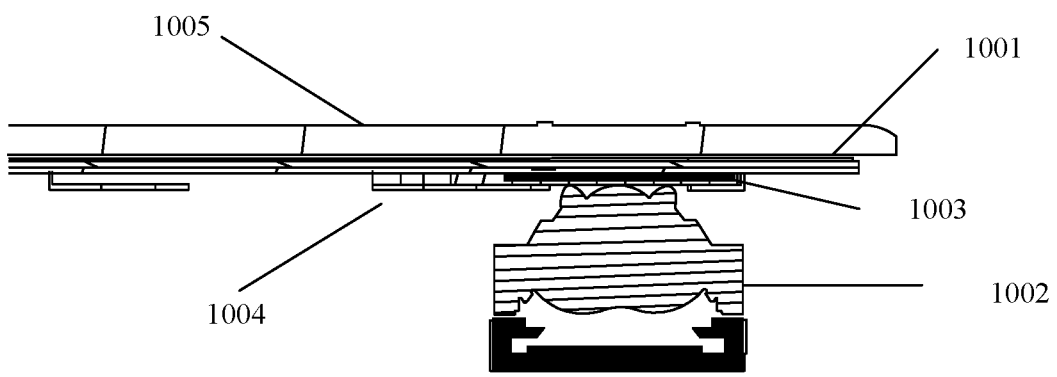
FIG. 5 is a fifth structure diagram of a terminal device according to some embodiments of the present disclosure.

As shown in FIG. 5, the protection component 1005 covers the first screen component 1001. The image acquisition component 1002, the first screen component 1001 and the second screen component 1003 are located on different planes respectively. The second screen component 1003 is positioned between the first screen component 1001 and the image acquisition component 1002, and the driving component 1004 is connected with the second screen component 1003.

In some embodiments, the protection component 1005 can be made of a glass material.

Figure 6:
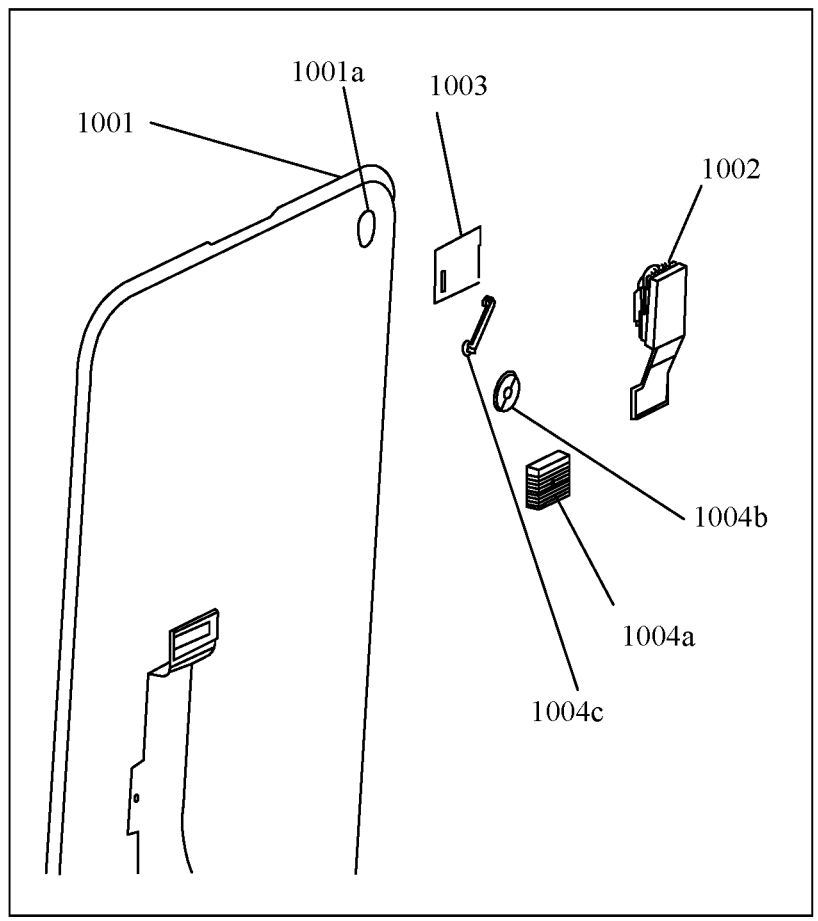
FIG. 6 is a sixth structure diagram of a terminal device according to some embodiments of the present disclosure.

In some embodiments, FIG. 6 is a sixth structure diagram of a terminal device according to some embodiments of the present disclosure. As shown in FIG. 6, the driving component 1004 includes: a first magnetic portion 1004a, a second magnetic portion 1004b and a transmission portion 1004c.

The first magnetic portion 1004a includes a coil and is configured to generate a magnetic force based on a current in the coil;

The second magnetic portion 1004b is configured to rotate about a rotating axis under action of the magnetic force.

The transmission portion 1004c is connected with the second magnetic portion and the second screen component, configured to rotate along with rotation of the second magnetic portion and drive the second screen component to move between the first position and the second position.

In the embodiment of the present disclosure, a corresponding magnetic force can be generated based on the energizing coil. It is to be noted that a magnetic force in an opposite direction can be generated based on a current in the opposite direction of the coil.

In the embodiment of the present disclosure, the second magnetic portion 1004b rotates about the rotating axis under action of the magnetic force. That is, the second magnetic portion 1004b is magnetic, and there is an angle difference between a direction of a magnetic force of the second magnetic portion 1004b and a direction of the magnetic force of the first magnetic portion 1004a, and thus the second magnetic portion can rotate under action of the magnetic force.

In some embodiments, the second magnetic portion includes, but not limited to, a magnet.

In another embodiment, the transmission portion 1004c includes a first end and a second end opposite to the first end. The first end is connected with the second magnetic portion 1004b and configured to rotate along with rotation of the second magnetic portion. The second end is connected with the second screen component 1003 and is capable of driving the second screen component to move between the first position and the second position.

In some embodiments, as shown in FIG. 6, the first magnetic portion 1004a is configured to generate a magnetic force in a second direction based on a current in a first direction of the coil; and generate a magnetic force in a fourth direction based on a current in a third direction of the coil.

The second magnetic portion 1004b is configured to move about the rotating axis in a first clock direction under action of the magnetic force in the second direction; and move about the rotating axis in a second clock direction under action of the magnetic force in the fourth direction. The first clock direction and the second clock direction are opposite rotating directions, for example, the first clock direction is a counterclockwise direction and the second clock direction is a clockwise direction.

The transmission portion 1004c is configured to: when moving about the rotating axis in the first clock direction along with the second magnetic portion, drive the second screen component to move from the first position to the second position; and when moving about the rotating axis in the second clock direction along with the second magnetic portion, drive the second screen component to move from the second position to the first position.

That is, according to the embodiment of the present disclosure, magnetic forces in different directions are generated based on different current directions in the coil, the second magnetic portion rotates about the rotating axis towards different rotating directions based on the magnetic forces in different directions, and the transmission portion that rotates along with rotation of the second magnetic portion is utilized to drive the second screen component to move between the first position and the second position. It can be seen that according to the embodiment of the present disclosure, electric energy can be converted into mechanical energy, and thus a purpose of driving movement of the second screen component can be achieved.

In the embodiment of the present disclosure, the current in the first direction and the current in the third direction are currents in opposite direction, and the magnetic force in the second direction and the magnetic force in the fourth direction are magnetic forces opposite in direction.

In some embodiments, the transmission portion includes, but not limited to, a transmission rod.

In some embodiments, when it is required to sense the ambient light through the light-sensitive surface to generate the image, the second screen component is driven to move from the second position to the first position.

Figure 7:
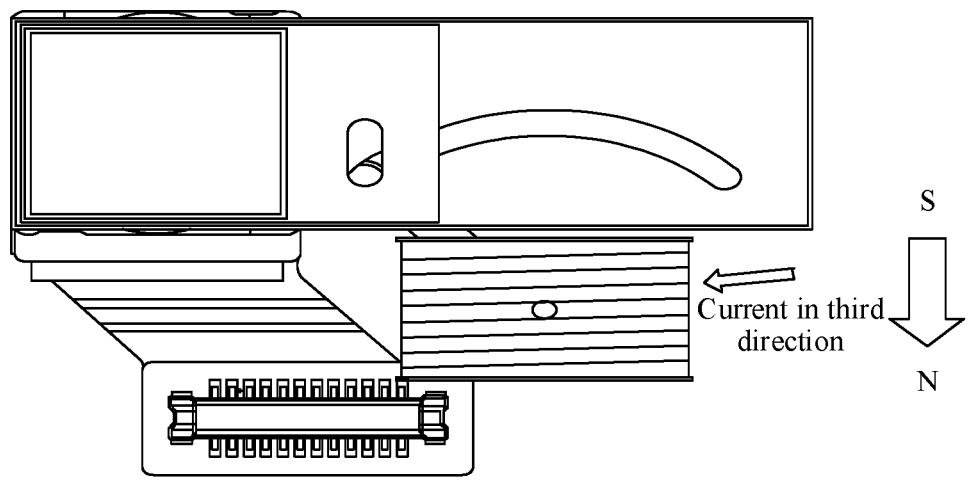
FIG. 7 is a first schematic diagram illustrating movement of a second screen component according to some embodiments of the present disclosure.

As shown in FIG. 7, the second screen component is at the second position, and the second screen component closes the first opening to cover the light-sensitive surface. In such case, the coil is energized, and the magnetic force in the fourth direction is generated based on the current in the third direction of the coil. The current in the third direction is a direction as shown by the arrow in FIG. 7, and the magnetic force in the fourth direction is a direction as shown by an arrow (S→N) in FIG. 7.

Figure 8:
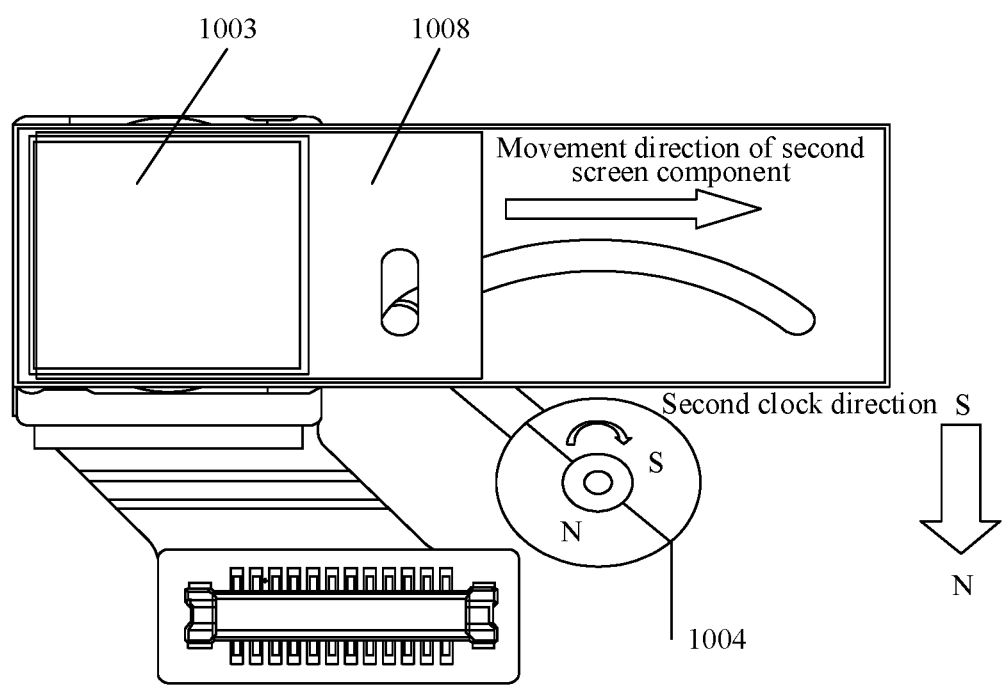
FIG. 8 is a second schematic diagram illustrating movement of a second screen component according to some embodiments of the present disclosure.

As shown in FIG. 8, the second magnetic portion moves about the rotating axis in the second clock direction under action of the magnetic force in the fourth direction. The second clock direction is a direction as shown by the arrow in FIG. 8. When the transmission portion moves about the rotating axis in the second clock direction depending on the second magnetic portion, a movement direction in which the second screen component is driven is a direction as shown by the arrow direction in FIG. 8.

Figure 9:
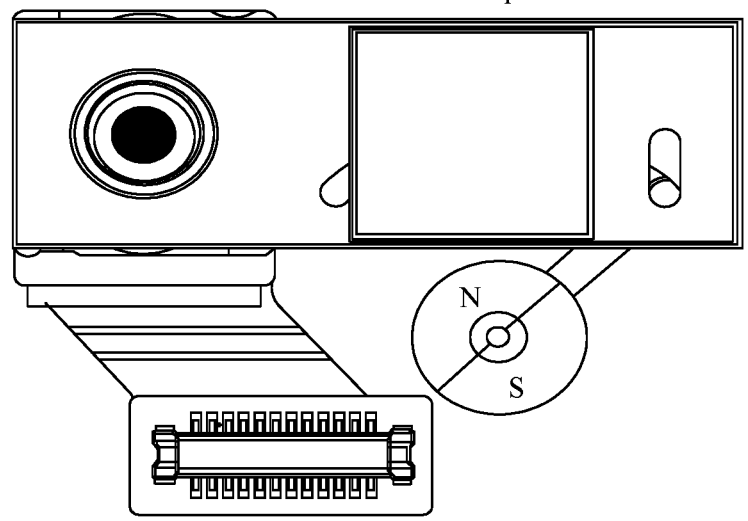
FIG. 9 is a third schematic diagram illustrating movement of a second screen component according to some embodiments of the present disclosure.

As shown in FIG. 9, the second screen component is at the first position. In such case, the second screen component is disposed behind the first screen component, and the light-sensitive surface of the image acquisition component is exposed, so that the ambient light can be sensed through the light-sensitive surface for generation of image.

In some embodiments, when it is not required to sense the ambient light through the light-sensitive surface to generate the image, the second screen component is driven to move from the first position to the second position.

Figure 10:
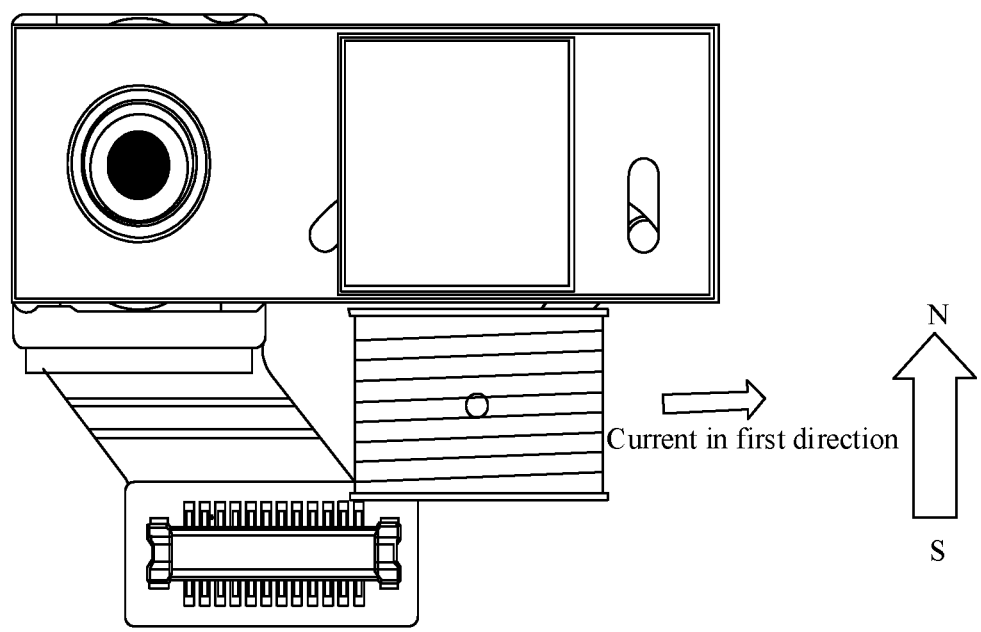
FIG. 10 is a fourth schematic diagram illustrating movement of a second screen component according to some embodiments of the present disclosure.

As shown in FIG. 10, the second screen component is at the first position, the second screen component is disposed behind the first screen component, and the first opening is opened to expose the light-sensitive surface. In such case, the coil is energized, and the magnetic force in the second direction is generated based on the current in the first direction of the coil. The current in the first direction is a direction as shown by the arrow direction in FIG. 10, and the magnetic force in the second direction is a direction as shown by the arrow (S→N) direction shown in FIG. 10.

Figure 11:
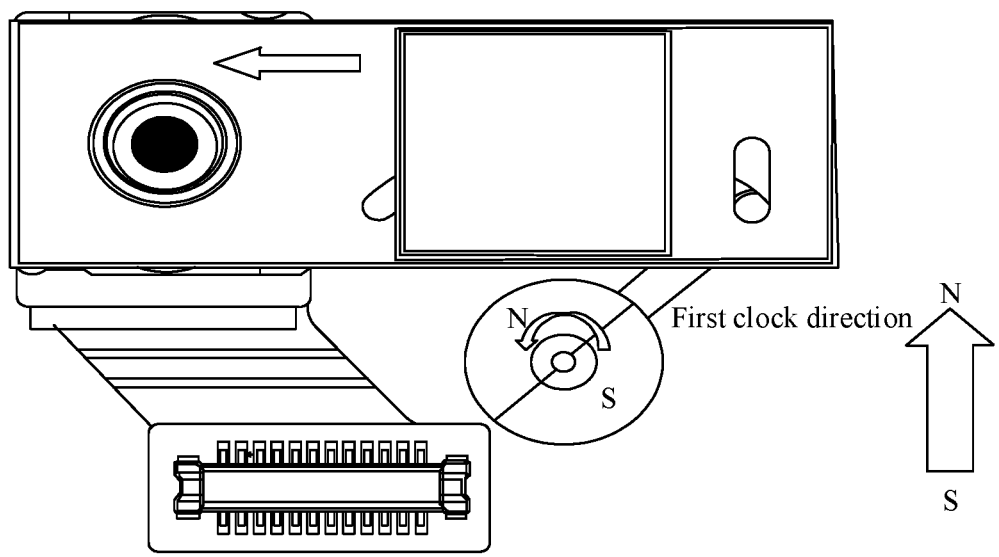
FIG. 11 is a fifth schematic diagram illustrating movement of a second screen component according to some embodiments of the present disclosure.

As shown in FIG. 11, the second magnetic portion moves about the rotating axis in the first clock direction under action of the magnetic force in the second direction. The first clock direction is a direction as shown by the arrow in FIG. 11. When the transmission portion moves about the rotating axis in the second clock direction depending on the second magnetic portion, a movement direction in which the second screen component is driven is the arrow direction shown in FIG. 11.

Figure 12:
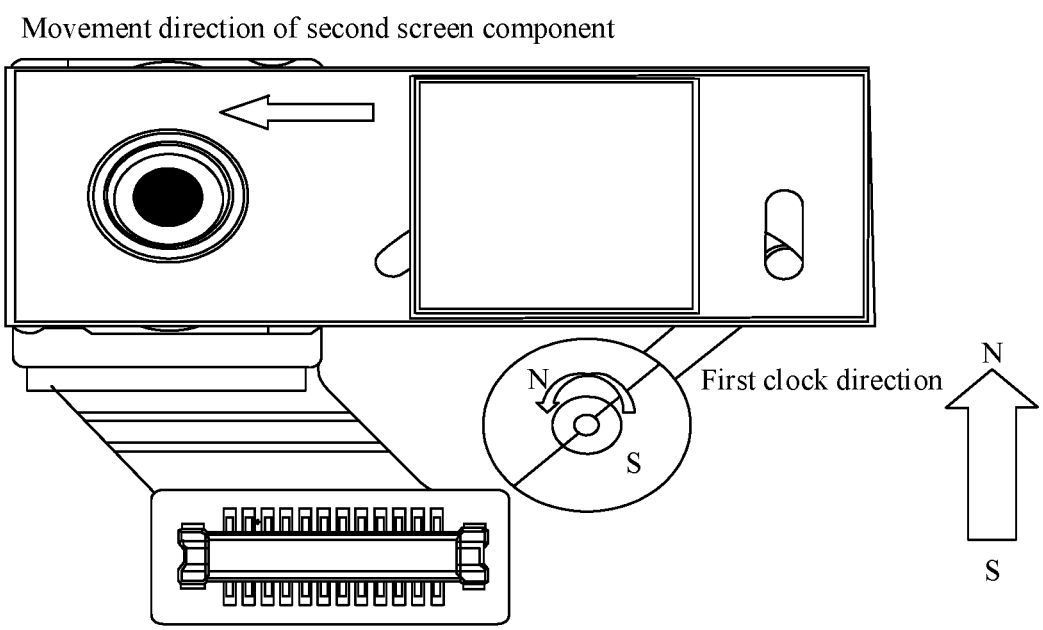
FIG. 12 is a sixth schematic diagram illustrating movement of a second screen component according to some embodiments of the present disclosure.

As shown in FIG. 12, the second screen component is at the second position. In such case, the second screen component closes the first opening to cover the light-sensitive surface and is exposed through the first opening.

Figure 13:
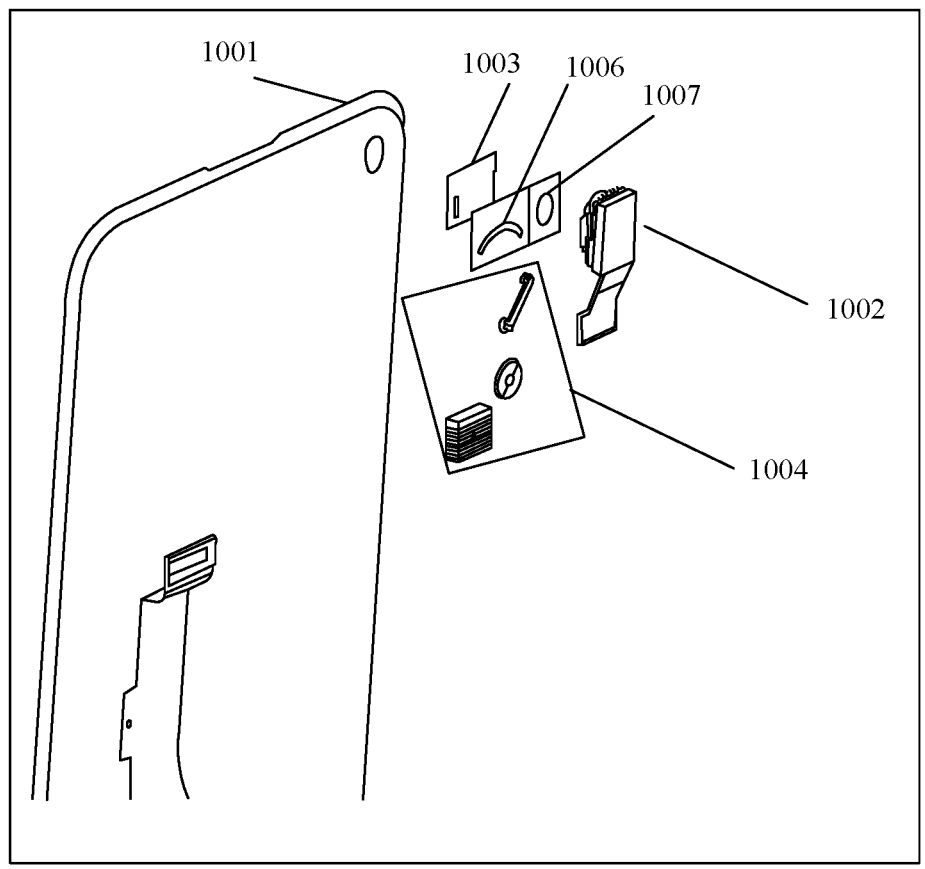
FIG. 13 is a seventh structure diagram of a terminal device according to some embodiments of the present disclosure.

In some embodiments, FIG. 13 is a seventh structure diagram of a terminal device according to some embodiments of the present disclosure. As shown in FIG. 13, the terminal device further includes: a movement trajectory limit component 1006 and a second opening 1007.

The movement trajectory limit component 1006 is positioned between the first position and the second position.

The driving component 1004 is configured to drive the second screen component to move along the movement trajectory limit component between the first position and the second position.

The second opening 1007 is positioned between the second screen component and the image acquisition component, aligned with the first opening and configured to when the first opening is opened, expose the light-sensitive surface of the image acquisition component for sensing of the ambient light.

That is, the movement trajectory limit component is configured to limit second screen component to move along the movement trajectory limit component only between the first position and the second position.

In another embodiment, the movement trajectory limit component includes a guide rail, and the second screen component can move along the guide rail.

In the embodiment of the present disclosure, the second opening is aligned with the first opening. A shape of the second opening can be set according to a design requirement, and for example, can be set to be a circle or another shape. The shape of the second opening can also be set according to the shape of the first opening and the shape of the light-sensitive surface, and for example, can be set to be the same shape as that of the light-sensitive surface and the first opening.

Of course, a size of the second opening can be set to be larger than or equal to the size of the first opening to achieve an effect of attractive appearance.

In some embodiments, as shown in FIG. 8, the terminal device further includes a connecting component 1008.

The connecting component 1008 is fixedly connected with the second screen component 1003.

The driving component 1004 is connected with the connecting component and configured to drive the connecting component to move to drive the second screen component to move along the movement trajectory limit component between the first position and the second position.

That is, in the embodiment of the present disclosure, the second screen component is fixedly connected with the connecting component and the driving component drives the connecting component to move, so as to drive the second screen component to move along the movement trajectory limit component between the first position and the second position.

In some embodiments, the movement trajectory limit component is provided with an arc moving groove.

The driving component is arranged to penetrate through the arc moving groove to be connected with the connecting component and configured to drive the connecting component to move along the arc moving groove.

That is, the driving component is arranged to penetrate through the arc moving groove to be connected with the connecting component and is capable of driving the connecting component to move along the arc moving groove, so as to drive the second screen component fixedly connected with the connecting component to move between the first position and the second position.

In another embodiment, a radian of the arc moving groove is centered on the rotating axis of the second magnetic portion.

In some embodiments, the connecting component is provided with a connecting groove; and the driving component sequentially is arranged to penetrate through the arc moving groove and then through the connecting groove to be connected with the connecting component.

That is, the driving component can penetrate through the arc moving groove firstly, then through the connecting groove, and is coupled with the connecting groove of the connecting component. The driving component drives the connecting component through a connection member to move along the arc moving groove, so as to drive the second screen component fixedly connected with the connecting component to move between the first position and the second position.

In another embodiment, the connecting groove of the connecting component is an ellipse, and when the second screen component moves, the connecting member moves in the ellipse.

Figure 14:
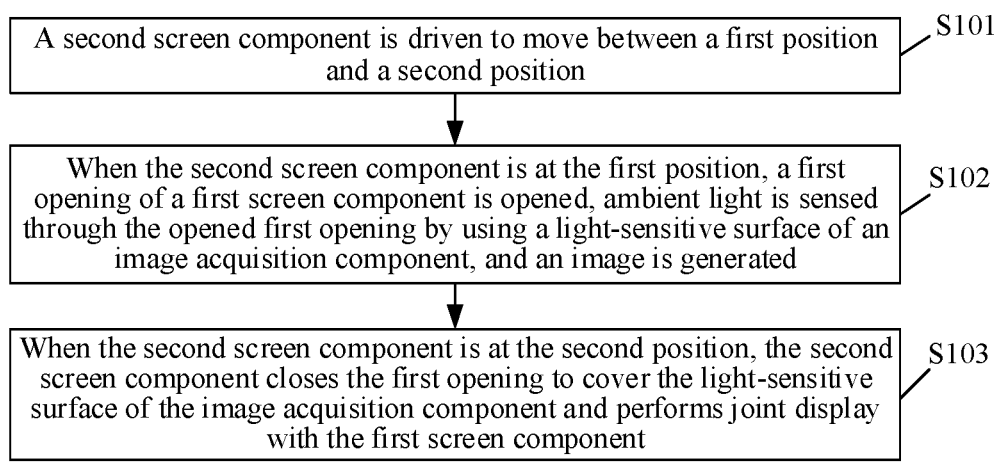
FIG. 14 is a flowchart illustrating a display method according to some embodiments of the present disclosure.

FIG. 14 is a flowchart showing a display method according to some embodiments of the present disclosure. As shown in FIG. 14, the display method includes the following operations in S101-S103.

In S101, a second screen component is driven to move between a first position and a second position.

In S102, when the second screen component is at the first position, a first opening of a first screen component is opened, an image acquisition component senses ambient light through the opened first opening by using a light-sensitive surface of the image acquisition component, and generates an image.

In S103, when the second screen component is at the second position, the second screen component closes the first opening to cover the light-sensitive surface of the image acquisition component and performs joint display with the first screen component.

In the embodiments of the present disclosure, when the image acquisition component is required to generate the image, the second screen component is at the first position, the first opening is opened, and the light-sensitive surface of the image acquisition component can sense the ambient light to generate the image; and when the image acquisition component is not required to generate the image, the second screen component is at the second position, the second screen component closes the first opening and is exposed through the first opening, and the exposed second screen component can perform joint display with the first screen component. Therefore, by adjustment of a position of the second screen component, on one hand, the light-sensitive surface can be exposed for selfie when a user is desired to take the selfie; and on the other hand, when the user requires the terminal device to display normally, the first opening can be covered by using the second screen component so as to achieve a visual full-screen display effect.

In some embodiments, the operation that the second screen component is driven to move between the first position and the second position includes that: the second screen component is driven, based on a driving component connected with the second screen component, to move between the first position and the second position.

In the embodiments of the present disclosure, when the image acquisition component is required to generate the image, the second screen component can be driven through the driving component to be at the first position; and when the image acquisition component is not required to generate the image, the second screen component can be driven through the driving component to be at the second position. Therefore, the second screen component can be driven intelligently according to different requirement, so that the light-sensitive surface is exposed for selfie when the user is desired to take a selfie and achieve the visual full-screen display effect when the user requires the terminal device to display normally.

In some embodiments, the operation that the second screen component is driven based on the driving component connected with the second screen component to move between the first position and the second position includes the following actions A magnetic force is generated based on a current in a coil of a first magnetic portion of the driving component; a second magnetic portion of the driving component rotates about a rotating axis under action of the magnetic force; and the second screen component is driven to move between the first position and the second position through a transmission portion, which rotates along with rotation of the second magnetic portion, of the driving component.

In the embodiments of the present disclosure, the magnetic force is generated based on the current in the coil, then the second magnetic portion rotates about the rotating axis based on the magnetic force, and the second screen component is further driven to move between the first position and the second position through the transmission portion that rotates along with rotation of the second magnetic portion. It can be seen that electric energy can be converted into mechanical energy by using a principle of electromagnetic induction, and thus a purpose of driving movement of the second screen component can be achieved.

In some other embodiments, the operation that the second screen component is driven based on the driving component connected with the second screen component to move between the first position and the second position includes the following action.

The second screen component is driven through the driving component connected with the second screen component to move along a movement trajectory limit component between the first position and the second position, the movement trajectory limit component being positioned between the first position and the second position.

In some other embodiments, the operation that the second screen component is driven based on the driving component connected with the second screen component to move along the movement trajectory limit component between the first position and the second position includes the following actions.

A connecting component is driven through the driving component connected with the connecting component fixed on the second screen component to move; and the second screen component is driven through the moving connecting component to move along the movement trajectory limit component between the first position and the second position.

In some embodiments, the operation that the magnetic force is generated based on the current in the coil of the first magnetic portion of the driving component includes the following action.

A magnetic force of a second direction is generated based on a current in a first direction of the coil; and a magnetic force in a fourth direction is generated based on a current in a third direction of the coil.

In the embodiments of the present disclosure, magnetic forces in different directions are generated based on currents in different directions within the coil. The current in the first direction and the current in the third direction are currents in opposite direction. The magnetic force in the second direction and the magnetic force in the fourth direction are magnetic forces in opposite direction.

In some embodiments, the operation that the second magnetic portion of the driving component rotate about the rotating axis under action of the magnetic force includes the following actions.

The second magnetic portion rotates about the rotating axis in a first clock direction under action of the magnetic force in the second direction; or, the second magnetic portion rotates about the rotating axis in a second clock direction under action of the magnetic force in the fourth direction. The first clock direction and the second clock direction are opposite rotating directions.

In the embodiments of the present disclosure, the second magnetic portion rotates about the rotating axis in different clock directions based on the magnetic forces in different directions, and thus the second magnetic portion can rotate by virtue of the magnetic forces.

In some embodiments, the operation that the second screen component is driven to move between the first position and the second position by using the transmission portion, which rotates along with rotation of the second magnetic portion, of the driving component includes the following actions.

The second screen component is driven to move from the first position to the second position by using a second end of the transmission portion that rotates along with rotation of the second magnetic portion about the rotating axis in the first clock direction; or, the second screen component is driven to move from the second position to the first position by using the second end of the transmission portion that rotates along with rotation of the second magnetic portion about the rotating axis in the second clock direction.

In the embodiments of the present disclosure, magnetic forces in different directions are firstly generated based on different current directions in the coil, and then the second magnetic portion rotates about the rotating axis in different rotating directions based on the magnetic forces in different directions, so as to drive the second screen component to move between the first position and the second position. It can be seen that electric energy is converted into mechanical energy by using a principle of electromagnetic induction, and thus the purpose of driving movement of the second screen component is achieved.

Various embodiments of the present disclosure can have one or more of the following advantages.

When the image acquisition component is required to generate the image, the second screen component is positioned at the first position, and the light-sensitive surface of the image acquisition component can sense the ambient light to generate the image through the first opening to smoothly complete image acquisition in condition that the image acquisition component does not occupy a display area of the terminal device. Meanwhile, when the image acquisition component is not required to generate the image, the second screen component moves from the first position to the second position, and the second screen component performs joint display with the first screen component. Therefore, by adjustment of a position of the second screen component, on one hand, the light-sensitive surface of the image acquisition component can be exposed for selfie when a user is desired to take a selfie; and on the other hand, when the user requires the terminal device to display normally, the first opening can be covered by the second screen component so as to achieve a visual full-screen display effect.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A terminal device, comprising:
a first screen component having a first opening;

an image acquisition component having a light-sensitive surface and configured to sense ambient light through the light-sensitive surface to generate an image in a case that the first opening is opened;
a second screen component; and
a driving component connected with the second screen component;
wherein:
the first opening is configured to open responsive to that that the second screen component is at a first position; and
the second screen component is configured to close the first opening to cover the light-sensitive surface and perform joint display with the first screen component responsive to that the second screen component is at a second position,
wherein the driving component comprises:
  a first magnetic portion, comprising a coil and configured to: generate a magnetic force in a second direction based on a current in a first direction of the coil, and generate a magnetic force in a fourth direction based on a current in a third direction of the coil;
  a second magnetic portion, configure to: move about the rotating axis in a first clock direction under action of the magnetic force in the second direction, and move about the rotating axis in a second clock direction under action of the magnetic force in the fourth direction, the first clock direction and the second clock direction being opposite rotation directions; and
  a transmission portion, connected with the second magnetic portion and the second screen component, and configured to: drive the second screen component to move from the first position to the second position responsive to moving about the rotating axis in the first clock direction along with rotation of the second magnetic portion, and drive the second screen component to move from the second position to the first position responsive to moving about the rotating axis in the second clock direction along with rotation of the second magnetic portion.

2. The terminal device of claim 1, further comprising:
a movement trajectory limit component, positioned between the first position and the second position, wherein the driving component is configured to drive the second screen component to move along the movement trajectory limit component between the first position and the second position; and
a second opening, positioned between the second screen component and the image acquisition component, wherein the second opening is aligned with the first opening and configured to when the first opening is opened, expose the light-sensitive surface of the image acquisition component for sensing the ambient light.

3. The terminal device of claim 2, further comprising:
a connecting component, fixedly connected with the second screen component,
wherein the driving component is connected with the connecting component and configured to drive the second screen component to move along the movement trajectory limit component between the first position and the second position by driving movement of the connecting component.

4. The terminal device of claim 3, wherein
the movement trajectory limit component is provided with an arc moving groove; and
the driving component is arranged to penetrate through the arc moving groove to be connected with the connecting component and configured to drive the connecting component to move along the arc moving groove.

5. The terminal device of claim 4, wherein
the connecting component is provided with a connecting groove; and
the driving component sequentially penetrate through the arc moving groove and the connecting groove to be connected with the connecting component.

6. A mobile phone comprising:
a first screen component having a first opening;
an image acquisition component having a light-sensitive surface and configured to sense ambient light through the light-sensitive surface to generate an image in a case that the first opening is opened; and
a second screen component; and
a driving component connected with the second screen component,
wherein:
the first opening is configured to open responsive to that that the second screen component is at a first position;
the second screen component is configured to close the first opening to cover the light-sensitive surface and perform joint display with the first screen component responsive to that the second screen component is at a second position; and
the second screen component is positioned at the first position responsive to that the image acquisition component is required to generate the image,
wherein the driving component comprises:
a first magnetic portion, comprising a coil and configured to: generate a magnetic force in a second direction based on a current in a first direction of the coil, and generate a magnetic force in a fourth direction based on a current in a third direction of the coil;
a second magnetic portion, configure to: move about the rotating axis in a first clock direction under action of the magnetic force in the second direction, and move about the rotating axis in a second clock direction under action of the magnetic force in the fourth direction, the first clock direction and the second clock direction being opposite rotation directions; and
a transmission portion, connected with the second magnetic portion and the second screen component, and configured to: drive the second screen component to move from the first position to the second position responsive to moving about the rotating axis in the first clock direction along with rotation of the second magnetic portion, and drive the second screen component to move from the second position to the first position responsive to moving about the rotating axis in the second clock direction along with rotation of the second magnetic portion.

7. The mobile phone of claim 6, wherein in response to that the image acquisition component is not required to generate the image, the second screen component moves from the first position to the second position, and the second screen component performs joint display with the first screen component.

8. The mobile phone of claim 7, wherein:
the mobile phone is configured, by adjustment of a position of the second screen component, to expose the light-sensitive surface of the image acquisition component in a selfie mode; and have the first opening covered by the second screen component so as to achieve a visual full-screen display effect in a normal display mode.

\* \* \* \* \*